(12) United States Patent
Grim, III et al.

(10) Patent No.: US 8,930,283 B2
(45) Date of Patent: Jan. 6, 2015

(54) DYNAMICALLY CONTROLLING A COMPUTER'S DISPLAY

(71) Applicant: International Business Machines Corporation, Armonk, NY (US)

(72) Inventors: Clifton E. Grim, III, Seabrook, TX (US); Rex E. Marzke, Houston, TX (US); Mark B. Stevens, Austin, TX (US); Gary A. Ward, Seabrook, TX (US); John D. Wilson, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/058,516

(22) Filed: Oct. 21, 2013

(65) Prior Publication Data

US 2014/0052509 A1 Feb. 20, 2014

Related U.S. Application Data

(63) Continuation of application No. 12/627,044, filed on Nov. 30, 2009, now abandoned.

(51) Int. Cl.
*G06F 17/00* (2006.01)
*G06G 7/00* (2006.01)
*G06Q 30/02* (2012.01)
*G06F 9/44* (2006.01)
*G09G 3/34* (2006.01)

(52) U.S. Cl.
CPC .......... *G09G 3/3406* (2013.01); *G06Q 30/0252* (2013.01); *G06Q 30/0283* (2013.01); *G06F 9/4445* (2013.01)
USPC ........................................................ 705/400

(58) Field of Classification Search
CPC ........................... G06Q 30/0283; G06Q 30/06
USPC .................................................. 705/7.35, 400
See application file for complete search history.

(56) References Cited

U.S. PATENT DOCUMENTS 4,586,157 A 4/1986 Rector et al.
5,729,214 A * 3/1998 Moore .......................... 340/905
(Continued)

OTHER PUBLICATIONS

Abowd et al. "Cyberguide: A Mobile Context-Aware Tour Guide", J.C. Baltzer AG, Science Publishers, Wireless Networks 3, 1997, pp. 421-433.
Barakonyi et al. "Ubiquitous Animated Agents for Augmented Reality", IEEE, Mixed and Augmented Reality, ISMAR 2006, IEEE/ACM International Symposium on, 2006, pp. 145-154.

(Continued)

*Primary Examiner* — Allen J Jung
(74) *Attorney, Agent, or Firm* — John R. Pivnichny; Law Office of Jim Boice (57) ABSTRACT

A method and/or computer system dynamically manages screen real estate of a remote computer's display. A first computer receives an initial state of screen real estate of a remote second computer's display on a portable computing device, where the initial state describes information displayed on the remote second computer's display. The first computer detects a change to an external physical environment of the remote second computer's display from one location to another location within a same building. The first computer then adjusts the initial state of the screen real estate in order to remotely create an adjusted state of the remote second computer's screen real estate, where the adjusted state comports with the change to the physical location of the remote second computer's display, and where the adjusted state alters an appearance of the information displayed on the remote second computer's display.

10 Claims, 4 Drawing Sheets

(56) References Cited

U.S. PATENT DOCUMENTS

| | | | |
|---|---|---|---|
| 7,225,414 | B1 | 5/2007 | Sharma et al. |
| 7,325,034 | B2 | 1/2008 | Douglis et al. |
| 2004/0225718 | A1 | 11/2004 | Heinzel et al. |
| 2005/0004842 | A1* | 1/2005 | Mammen .................. 705/14 |
| 2006/0031419 | A1 | 2/2006 | Huat |
| 2006/0287913 | A1 | 12/2006 | Baluja |
| 2008/0059571 | A1 | 3/2008 | Khoo |
| 2010/0103186 | A1* | 4/2010 | Luengen et al. ............ 345/589 |
| 2010/0207751 | A1* | 8/2010 | Follmer et al. ............. 340/439 |

OTHER PUBLICATIONS

Coles et al. "A Framework for Coordinated Multi-Modal Browsing With Multiple Clients", Proceedings of the Twelfth International World Wide Web Conference, WWW 2003, May 20-24, 2003, Budapest, Hungary, pp. 718-726.

U.S. Appl. No. 12/627,044—Non-Final Office Action Mailed Jan. 23, 2012.

U.S. Appl. No. 12/627,044—Non-Final Office Action Mailed Jun. 7, 2013.

U.S. Appl. No. 12/627,044—Notice of Allowance Mailed Nov. 12, 2013.

\* cited by examiner

DYNAMICALLY CONTROLLING A COMPUTER'S DISPLAY

The present application is a continuation of U.S. patent application Ser. No. 12/627,044, filed on Nov. 30, 2009, and entitled, "Dynamically Controlling a Computer's Display", which is incorporated herein by reference in its entirety.

BACKGROUND

The present disclosure relates to the field of computers, and specifically to information displayed on computer displays. Still more particularly, the present disclosure relates to remotely controlling content displayed on a computer display.

SUMMARY

A method and/or computer system dynamically manages screen real estate of a remote computer's display. A first computer receives an initial state of screen real estate of a remote second computer's display on a portable computing device, where the initial state describes information displayed on the remote second computer's display. The first computer detects a change to an external physical environment of the remote second computer's display from one location to another location within a same building. The first computer then adjusts the initial state of the screen real estate in order to remotely create an adjusted state of the remote second computer's screen real estate, where the adjusted state comports with the change to the physical location of the remote second computer's display, and where the adjusted state alters an appearance of the information displayed on the remote second computer's display.

DETAILED DESCRIPTION

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Figure 1:
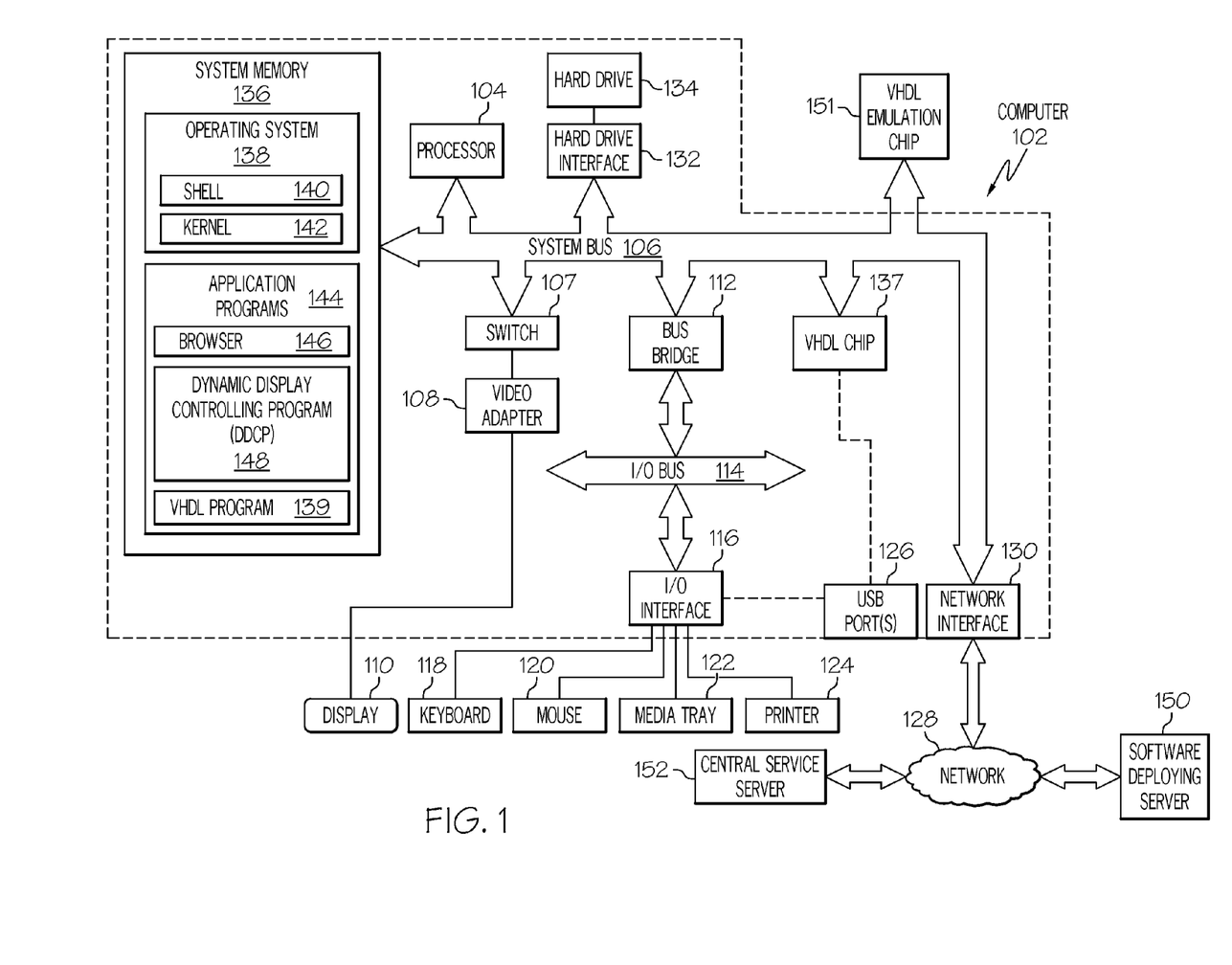
FIG. 1 depicts an exemplary computer in which the present disclosure may be implemented.

With reference now to the figures, and in particular to FIG. 1, there is depicted a block diagram of an exemplary computer 102, which may be utilized by the present disclosure. Note that some or all of the exemplary architecture, including both depicted hardware and software, shown for and within computer 102 may be utilized by software deploying server 150 and/or central service server 152. Similarly, the architecture depicted for computer 102 may be utilized by local client computer 202 shown below in FIG. 2.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., dynamic display controlling program—DDCP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in a preferred embodiment some or all of these ports are universal serial bus (USB) ports.

As depicted, computer 102 is able to communicate with a software deploying server 150 and central service server 152 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present disclosure will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include a dynamic display controlling program (DDCP) 148. DDCP 148 includes code for implementing the processes described below, including those described in FIGS. 2-4. In one embodiment, computer 102 is able to download DDCP 148 from software deploying server 150, including in an on-demand basis, such that the code from DDCP 148 is not downloaded until runtime or otherwise immediately needed by computer 102. Note further that, in one embodiment of the present disclosure, software deploying server 150 performs all of the functions associated with the present disclosure (including execution of DDCP 148), thus freeing computer 102 from having to use its own internal computing resources to execute DDCP 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from DDCP 148 causes VHDL program 139 to configure VHDL chip 137, which may be an FPGA, ASIC, etc.

In another embodiment of the present disclosure, execution of instructions from DDCP 148 results in a utilization of VHDL program 139 to program a VHDL emulation chip 151. VHDL emulation chip 151 may incorporate a similar architecture as described above for VHDL chip 137. Once DDCP 148 and VHDL program 139 program VHDL emulation chip 151, VHDL emulation chip 151 performs, as hardware, some or all functions described by one or more executions of some or all of the instructions found in DDCP 148. That is, the VHDL emulation chip 151 is a hardware emulation of some or all of the software instructions found in DDCP 148. In one embodiment, VHDL emulation chip 151 is a programmable read only memory (PROM) that, once burned in accordance with instructions from DDCP 148 and VHDL program 139, is permanently transformed into a new circuitry that performs the functions needed to perform the process described below in FIGS. 2-4.

The hardware elements depicted in computer 102 are not intended to be exhaustive, but rather are representative to highlight essential components required by the present disclosure. For instance, computer 102 may include alternate memory storage devices such as magnetic cassettes, digital versatile disks (DVDs), Bernoulli cartridges, and the like. These and other variations are intended to be within the spirit and scope of the present disclosure.

Figure 2:
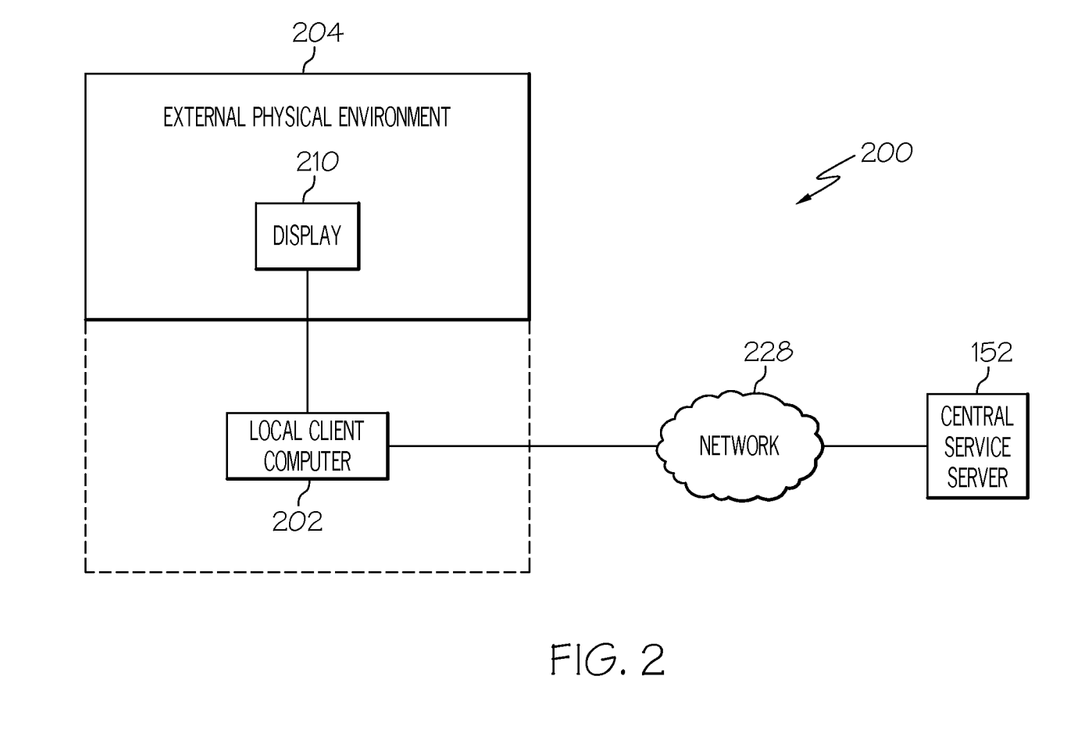
FIG. 2 illustrates an exemplary network in which a first computer can remotely control a second computer's display.

With reference now to FIG. 2, depicted is an exemplary network 200 in which the present invention may be implemented. A local client computer 202 (analogous to computer 102 shown in FIG. 1) has a display 210 (e.g., display 110 shown in FIG. 1). In one embodiment of the present invention, display 210 is controlled exclusively by central service server 152, which communicates with local client computer 202 via a network 228 (e.g., network 128 shown in FIG. 1). In another embodiment, display 210 is co-controlled by both local client computer 202 and central service server 152. As indicated, display 210 is located within an external physical environment 204. In another embodiment, both display 210 and local client computer 202 are located within the same external physical environment 204.

Assume, for exemplary purposes, that display 210 is a public display, such as an electronic billboard capable of producing high-resolution images, such as photographs, drawings, etc. The external physical environment 204 is understood to be a description of the physical conditions around display 210. Thus, external physical environment 204 may describe the ambient lighting condition (e.g., bright sunshine, cloudy skies, nighttime, etc.), air quality (e.g., excessively dusty conditions), as well as conditions that do not impact on the static viewability of the display 210, but which may impact on the dynamic viewability of the display 210 (e.g., how fast passing cars are traveling if display 210 is displayed next to a roadway). According to one embodiment of the present invention, display 210 and/or local client computer 202 have physical sensors on or near display 210, which are able to monitor the ambient conditions of the external physical environment 204. In another embodiment, such sensors are remote (e.g., satellite), but are still able to monitor the conditions of the external physical environment 204 in real time.

Figure 3:
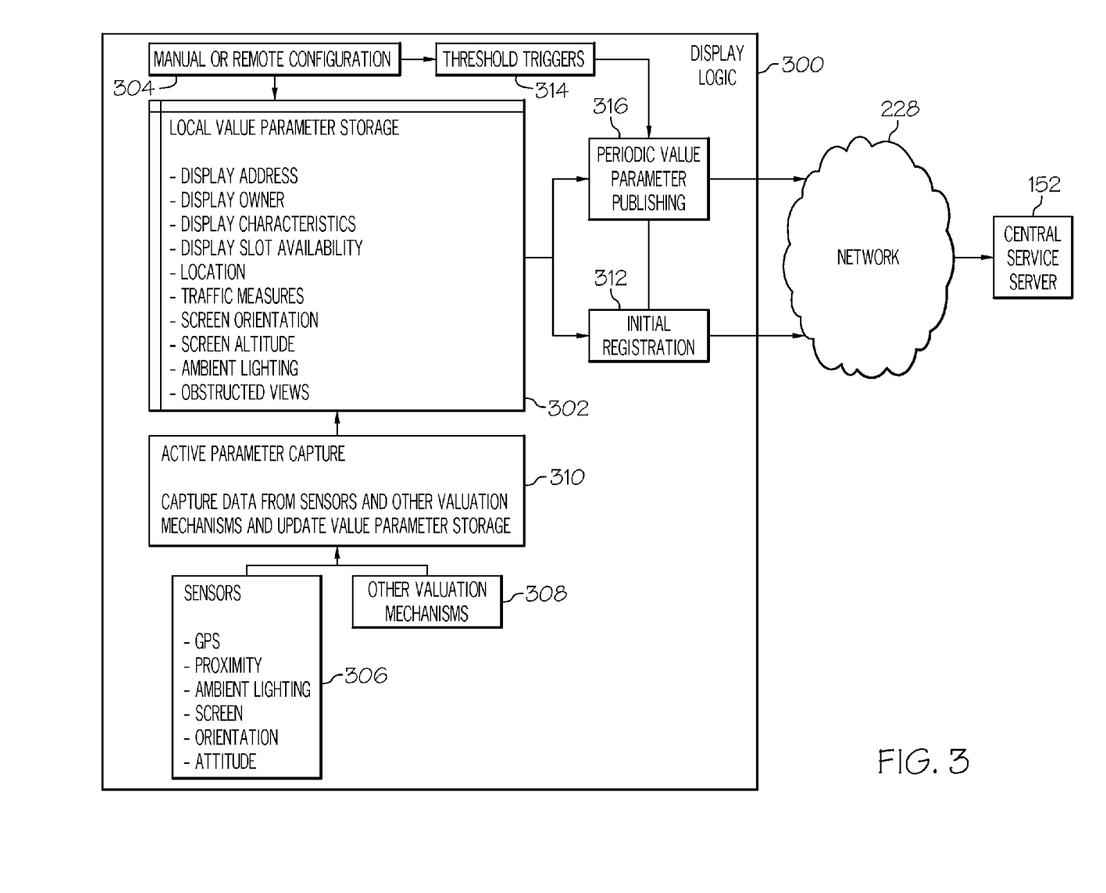
FIG. 3 depicts a high level diagram of parameters used by a central service server to control a display of a remote computer.

Referring now to FIG. 3, additional detail of display logic 300 associated with display 210 shown in FIG. 2 is presented. In one embodiment, display logic 300 is part of local client computer 202, and comprises DDCP 148 shown in FIG. 1. Again, note that display 210 may be any type of display associated with displaying visual content, and includes, but is not limited to, a computer monitor, an electronic billboard display, a phone and/or personal digital assistant (PDA) screen, etc. Within display logic 300 is hardware/software logic capable of handling processes and activities represented by blocks 302-316. With reference now to block 302, display logic 300 is capable of storing various internal and external parameters used to describe display 210 and external physical environment 204. For example, an internet protocol (IP) and/or media access control (MAC) address of the local client computer 202 and/or display 210 may be stored. The owner of the local client computer 202 and/or display 210 may also be stored. Other characteristics of display 210, such as the dots per inch (DPI) resolution, format (e.g., high definition monitor, low resolution phone display, etc.), slot availability, etc. may also be stored. These parameters are representative of internal and/or inherent characteristics/parameters of display 210. In addition, external physical descriptions can be stored, including the actual physical location of the display 210, what physical orientation (e.g., what direction, attitude, etc. it is pointing towards), the local ambient lighting conditions, whether there are any obstructed views to the display 210, etc.

The parameters and their storage described in block 302 may be manually or automatically configured, either remotely (by central service server 152) or locally (by local client computer 202), as described in block 304. Whether configured manually, automatically, locally, and/or remotely, the information regarding the external physical environment may be provided by electrical and/or electromechanical sensors, as described in block 306. These sensors are able to sense the physical location of the display (e.g., using global positioning satellites (GPS) technology), the proximity to other devices, structures, etc., ambient lighting, screen orientation and attitude, etc. Other valuation mechanisms (block 308) used to sense the condition (external environment and/or internal conditions) include, but are not limited to, internal (to the computer and/or the display) thermal probes, external thermal probes, screen test logic, etc. These valuation mechanisms may also include logic for determining the appearance of information displayed on the display, including a description of any "unused real estate" (i.e., areas on the display that are not displaying any information or else are displaying information that is deemed insignificant according to its staleness, etc.), font sizes, screen cropping (in which information is not displayed at all, or only if scrolled to), etc.

As described in block 310, the information parameters described for the display 210 are captured and stored in the local value parameter storage (described in block 302), and are initially registered for that display (block 312). Subsequently, if any of the display parameters change to the point that the change triggers a threshold level (block 314), then these changes are used to update (block 316) the initial registration (312).

Figure 4:
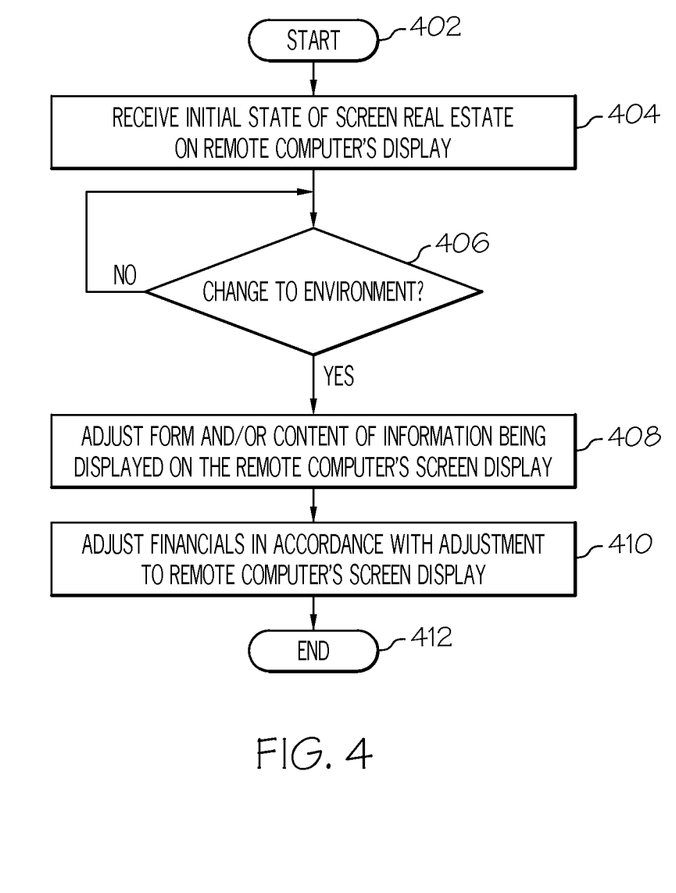
FIG. 4 is a high-level flow-chart of exemplary acts performed by a first computer to remotely control a display of a second computer in response to a change to a physical external environment of the second computer's display.

With reference now to FIG. 4, a high-level flow-chart of exemplary acts performed by a first computer to remotely control a display of a second computer in response to a change to a physical external environment of the second computer's display is presented. After initiator block 402, a first computer (e.g., central service server 152) receives an initial state of the screen real estate of a remote computer's display (e.g., display 210), as described in block 404. As noted above, this initial state describes information and how it is displayed on the display, including font sizes, cropping, any unused real estate, etc.

As described in query block 406, a determination is made as to whether a change to the external physical environment of the remote computer's display has occurred. This change to the external physical environment may take on any of multiple different embodiments. For example, the change may be simply moving the display (and or its supporting computer) from one location to another in a same building. Thus, if a laptop is moved from a cubicle to a conference room, the user may want the display to be harder to view (in the interest of confidentiality) or easier to view (in the interest of sharing information on the screen).

In another embodiment, the change to the external physical environment may be a change to ambient lighting. For example, assume that the display is in a public location, such as a screen for announcing arrival times at an airport. If the room gets darker (e.g., due to cloud cover, movement to night, etc.), then the screen would be remotely directed (e.g., by central service server 152) to change the font sizes, modify what content is displayed (e.g., removing advertisement in order to accommodate the increased font sizes), etc. In another example, the display may be outdoors. If the air around the display partially obscures the display (e.g., from fog, mist, smoke, dust, etc.), then the display may be adjusted in brightness, font size, etc. Note that the brightness is not adjusted merely due to the brightness of the ambient lighting, but is rather adjusted to "cut through" the obscuring air. That is, a dust storm may leave the area around the display just as bright as if there were no dust storm, but dust sensors associated with the display would detect the dust, in order to cause the screen to be adjusted accordingly (changing refresh rates, brightness, removing and/or adding content, etc.).

In another embodiment, a change to the external physical environment may be to viewers of the screen, rather than changes to the screen's immediate surroundings. That is, consider a screen that is actually a billboard-sized video screen, which presents advertisements to passing motorists. A local sensor can detect the traffic flow (i.e., how slow or fast passing vehicles are moving). This local sensor can comprise a motion/speed (e.g., radar gun) detector aimed at the passing traffic. Alternatively, the local sensor can be replaced by information from a traffic reporting service, which identifies traffic slow-downs, etc. If the traffic has slowed down or stopped, then the information displayed may be more detailed (including the addition of animation, etc.). If the traffic speeds up, then a "pared down" version of the information may be displayed.

In another embodiment, the change to the external physical environment may be to a vehicle to which the display is mounted. For example, consider a video display that is mounted to a taxicab or a bus. A local GPS device detects the exact location of such a vehicle. If the vehicle is in a theater district of a city, then theater district advertisements (e.g., for restaurants, tickets, etc.) would be displayed on the display. If the vehicle is in the suburbs, then the display would change to display advertisements for little league sports, grocery stores, etc.

With reference now to block 408, if a change to the external physical environment has occurred, then the form and/or content of information displayed on the display, including state such as font size, content, brightness, cropping, etc. is adjusted accordingly, as described in exemplary manner above. That is, the state can be changed to change the substantive content (switching from one text to another, switching from text to video and/or video to text, etc.), or it may change how the initial content is viewed (changing brightness, font, etc. of text, video, etc.) in order to adjust the readability of the original text.

As described in block 410, an advertisement or similar fee may be adjusted if the image on the screen is adjusted. For example, if traffic comes to a stop (see description above for the billboard-sized screen next to a public roadway), and more detailed text and/or video is added, then the advertisement fee for displaying such information may be increased, with the assumption that the screen now has a "captive audience" that is more likely to watch the advertisement.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the disclosure of the present application in detail and by reference to illustrative embodiments thereof, it will be apparent that modifications and variations are possible without departing from the scope of the disclosure defined in the appended claims.

What is claimed is:

1. A method of dynamically managing screen real estate of a remote computer's display, the method comprising:
    receiving, by a first computer, an initial state of screen real estate of a remote second computer's display, wherein the remote second computer's display is a display on a portable computing device, and wherein the initial state describes information displayed on screen real estate of the remote second computer's display;
    detecting, by the first computer, a change to an external physical environment of the remote second computer's display, wherein the change to the external physical environment of the remote second computer's display is a change to a physical location of the remote second computer's display from one location to another location within a same building; and
    adjusting, by the first computer, the initial state of the screen real estate by remotely creating an adjusted state of the screen real estate, wherein the creating of the adjusted state is in response to the change to the physical location of the remote second computer's display from one location to another location within the same building, wherein the creating of the adjusted state alters an appearance of the information displayed on the screen real estate of the remote second computer's display, and wherein the altering of the appearance of the information is performed by one or more of changing a brightness on the remote second computer's display, changing a font of the information displayed, switching a display of the information from text to video, and switching a display of the information from video to text.

2. The method of claim 1, wherein a fee is charged for displaying content on the remote second computer's display, and wherein the method further comprises:
    in response to the change to the physical location of the remote second computer's display, adjusting a fee for displaying the content on the remote second computer's display.

3. The method of claim 1, wherein the change to the external physical environment of the remote second computer's display further comprises a change to ambient lighting at the remote second computer's display.

4. The method of claim 1, wherein the adjusted state of the screen real estate reflects a change to content displayed on the remote second computer's display.

5. The method of claim 1, wherein the adjusted state of the screen real estate reflects a change to visual appearance of content displayed on the remote second computer's display, wherein the change to the visual appearance adjusts a readability of the content while retaining original information represented by the content.

6. A computer system comprising:
    a central processing unit (CPU), a computer readable memory, and a computer readable storage media;
    first program instructions to receive an initial state of screen real estate of a remote computer's display, wherein the remote computer's display is a display on a portable computing device, and wherein the initial state describes information displayed on screen real estate of the remote computer's display;
    second program instructions to detect a change to an external physical environment of the remote computer's display, wherein the change to the external physical environment of the remote computer's display is a change to a physical location of the remote computer's display from one location to another location within a same building; and third program instructions to adjust the initial state of the screen real estate by remotely creating an adjusted state of the screen real estate, wherein the creating of the adjusted state is in response to the change to the physical location of the remote computer's display from one location to another location within the same building, wherein the adjusted state alters an appearance of the information displayed on the screen real estate of the remote computer's display, and wherein the altering the appearance of the information is performed by one or more of changing a brightness on the remote computer's display, changing a font of the information displayed, switching a display of the information from text to video, and switching a display of the information from video to text; and wherein the first, second, and third program instructions are stored on the computer readable storage media for execution by the CPU via the computer readable memory.

7. The computer system of claim 6, wherein a fee is charged for displaying content on the remote computer's display, and wherein the computer system further comprises:

fourth program instructions to, in response to the change to the physical location of the remote computer's display, adjust a fee for displaying the content on the remote computer's display; and wherein the fourth program instructions are stored on the computer readable storage media for execution by the CPU via the computer readable memory.

8. The computer system of claim 6, wherein the change to the external physical environment of the remote computer's display further comprises a change to ambient lighting at the remote computer's display.

9. The computer system of claim 6, wherein the adjusted state of the screen real estate reflects a change to content displayed on the remote computer's display.

10. The computer system of claim 6, wherein the adjusted state of the screen real estate reflects a change to visual appearance of content displayed on the remote computer's display, wherein the change to the visual appearance adjusts a readability of the content while retaining original information represented by the content.

* * * * *